(12) United States Patent
Lee et al.

(10) Patent No.: US 8,323,537 B2
(45) Date of Patent: Dec. 4, 2012

(54) METHOD OF MANUFACTURING ALL-IN-ONE TYPE LIGHT GUIDE PLATE

(75) Inventors: Hong-seok Lee, Seongnam-si (KR); Hwan-Young Choi, Anyang-si (KR); Jun-bo Yoon, Daejeon (KR); Joo-hyung Lee, Daejeon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 784 days.

(21) Appl. No.: 11/957,846

(22) Filed: Dec. 17, 2007

(65) Prior Publication Data

US 2008/0303180 A1 Dec. 11, 2008

(30) Foreign Application Priority Data

Jun. 8, 2007 (KR) .................. 10-2007-0056046

(51) Int. Cl.
*B29D 11/00* (2006.01)
(52) U.S. Cl. .............. 264/1.24; 264/1.27; 264/1.36; 264/1.38; 264/1.7; 264/2.5; 264/334; 425/440; 427/163.2

(58) Field of Classification Search ............... 264/1.1, 264/1.24, 1.6, 1.38, 1.27, 1.36, 2.7, 1.7, 2.5, 264/334; 425/440; 427/162, 163.2
See application file for complete search history.

(56) References Cited

U.S. PATENT DOCUMENTS

| 2005/0111776 | A1 | 5/2005 | Martin et al. | |
| 2007/0104440 | A1* | 5/2007 | Kim et al. | 385/129 |
| 2008/0068862 | A1* | 3/2008 | Shimura | 362/619 |

FOREIGN PATENT DOCUMENTS

| JP | 2003100132 | 4/2003 |
| JP | 2004314539 | 11/2004 |
| KR | 100691500 A | 1/2002 |
| KR | 1020060028028 A | 3/2006 |
| KR | 1020070002647 A | 1/2007 |
| KR | 1020070029320 A | 3/2007 |

* cited by examiner

*Primary Examiner* — Mathieu D. Vargot
(74) *Attorney, Agent, or Firm* — Sughrue Mion, PLLC

(57) ABSTRACT

Provided is a method of manufacturing an all-in-one type light guide plate. The method includes: fabricating a master including a plurality of inverse-prism shape structures; forming an elastic mold by applying an elastomer on the master; and fabricating the all-in-one type light guide plate, on which a plurality of inverse-prism shape structures are integrally formed, by applying a light transmissive material on the elastic mold.

18 Claims, 9 Drawing Sheets

HEAT, UV

METHOD OF MANUFACTURING ALL-IN-ONE TYPE LIGHT GUIDE PLATE

CROSS-REFERENCE TO RELATED PATENT APPLICATIONS

This application claims the benefit of Korean Patent Application No. 10-2007-0056046, filed on Jun. 8, 2007, in the Korean Intellectual Property Office, the disclosure of which is incorporated herein in its entirety by reference.

BACKGROUND OF THE INVENTION

1. Field of the Invention

The present invention relates to a method of manufacturing an all-in-one type light guide plate.

2. Description of the Related Art

Backlight apparatuses illuminate flat panel display apparatuses, such as liquid crystal display apparatuses. Backlight apparatuses can be classified as direct light or light guide type backlight apparatuses, according to the position of the light sources. Light guide type backlight apparatuses are further classified as flat or wedge type backlight apparatuses.

Direct light type is a surface emission method that disposes a light source directly under a light emitting surface. A plurality of light sources can be disposed to improve the brightness and increase the light emission area. However, if power consumption increases, and if the backlight apparatus becomes thin, uniformity of the light is degraded, and thus, it is difficult to make the backlight apparatus thin.

The light guide type uses a light guide plate for guiding a ray to a light emitting surface, and the light source is disposed on a side surface of the light guide plate. A length of the side surface of the light guide plate limits the number of light sources, and thus, the backlight apparatus is thin. However, a process for distributing the brightness, throughout the entire light emitting surface, is complex.

The flat type, which is a type of light guide type backlight apparatus, is used in monitors or in cases requiring a high brightness. Light sources can be fixed on both sides or four corners of the light guide plate, and a plurality of light sources is used in order to increase the brightness. A side thickness of the light guide plate must also be uniform.

The wedge type, which is another type of light guide type backlight apparatus, is used in apparatuses where a plurality of light sources cannot be used due to limited power consumption, such as notebook computers. A surface, through which a light source is induced, of the backlight apparatus has a large width, and the other surface has a narrow width to reduce a backlight's weight.

A line light source and a point light source can be used as light sources in the light guide type backlight apparatus. The line light source can be a cold cathode fluorescent lamp (CCFL), having electrodes on both ends installed in a pipe. The point light source can be a light emitting diode (LED). The CCFL can emit an intense white light, obtain high brightness, and has high uniformity within a large area. However, the CCFL is driven by radio frequency alternating current (AC) signals, and operates within a small temperature range. The LED has lower brightness and lower uniformity when compared to the CCFL. However, the LED is driven by direct current (DC) signals, has a long lifespan, and operates within a wide temperature range. In addition, the LED is thin.

FIG. 1 is a side sectional view of a side emission type backlight apparatus, according to the conventional art.

Referring to FIG. 1, line light sources 10 are disposed on both side surfaces 21 and 22 of a light guide plate 20. A light path changing unit 23 is formed on a lower surface of the light guide plate 20 to discharge the light, incident from the line light sources 10, towards a light emitting surface 24.

A plurality of inverse-prism shape structures 30 are disposed on an upper surface of the light guide plate 20 to diffuse the light emitted from the light emitting surface 24. The inverse-prism shape structures 30 are fixed on the upper surface of the light guide plate 20 using an adhesive layer 32.

The light incident into the light guide plate 20, from the line light sources 10, is emitted through the light emitting surface 24, of the light guide plate 20, by the light path changing unit 23. The light incident then spreads to the upper portion of the light guide plate 20 by the inverse-prism shape structures 30, after passing through the adhesive layer 32.

However, since the inverse-prism shape structures 30 are fixed on the upper surface of the light guide plate 20, by the adhesive layer 32, the light incident into the inverse-prism shape structures 30 must pass through the adhesive layer 32. The adhesive layer 32 interferes and affects the quality of the light. Therefore, the adhesive layer 32 is not advantageous because the performance of the inverse-prism shape structures 30 is determined by the degree of adhesion in the adhesive layer 32.

In order to solve the problem stated above, an all-in-one type light guide plate, in which the inverse-prism shape structure is integrally formed with the light guide plate, has been provided. In order to form the all-in-one type light guide plate, a master, in which the shape of the all-in-one type light guide plate is molded, is fabricated A material is filled into the master, and then separated to form the all-in-one type light guide plate.

According to this method, since the master becomes a mold, in order to form a plurality of molds, the fabrication of the master must be repeated many times.

SUMMARY OF THE INVENTION

The present invention provides a method of manufacturing an all-in-one type light guide plate, which can fabricate a plurality of elastic molds using one master, and can manufacture the all-in-one type light guide plates using the elastic molds.

According to an aspect of the present invention, there is provided a method of manufacturing an all-in-one type light guide plate, the method including: fabricating a master including a plurality of inverse-prism shape structures; forming an elastic mold by applying an elastomer on the master; and fabricating the all-in-one type light guide plate, on which a plurality of inverse-prism shape structures are integrally formed, by applying a light transmissive material on the elastic mold.

The fabricating of the master may include: forming a mask, on which a plurality of openings for forming a plurality of inverse-prism shape structures are patterned, on a glass substrate; depositing a photoresist on the mask; irradiating ultraviolet rays (UV) from an upper portion of the glass substrate, to spread the UV rays; and forming the plurality of inverse-prism shape structures by removing portions of the photoresist, which are not exposed to the UV rays.

According to another aspect of the present invention, there is provided a method of manufacturing an all-in-one type light guide plate, the method including: forming a light transmissive material on a base; forming a plurality of inverse-prism shape structures on an elastic roller mold by rotating an elastic roller mold, which includes a roller formed of an elastomer and a plurality of inverse-prism shape blocks protruding from an outer circumferential surface of the roller, on the light transmissive material; and plastic deforming a portion where the elastic roller mold and the light transmissive material contact each other.

BRIEF DESCRIPTION OF THE DRAWINGS

The above, other features, and advantages of the present invention will become more apparent by describing in detail exemplary embodiments thereof with reference to the attached drawings in which.

DETAILED DESCRIPTION OF THE INVENTION

FIGS. 2A through 2I are cross-sectional views sequentially illustrating a method of manufacturing an all-in-one type light guide plate, according to an embodiment of the present invention.

Figure 2A:
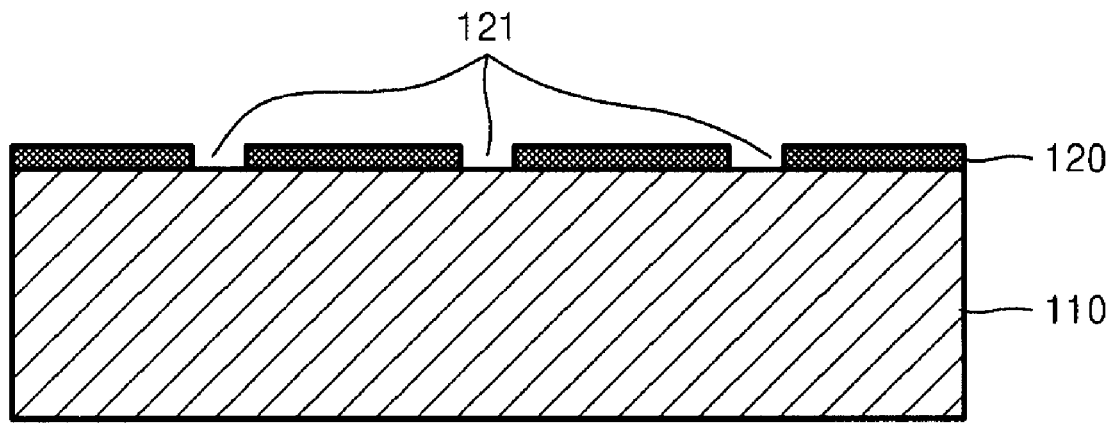
FIGS. 2A through 2I are cross-sectional views sequentially illustrating a method of manufacturing an all-in-one type light guide plate, according to an embodiment of the present invention.

Referring to FIG. 2A, a mask 120, including a plurality of openings 121 for forming a plurality of inverse-prism shape structures, is located on a glass substrate 110.

Figure 2B:
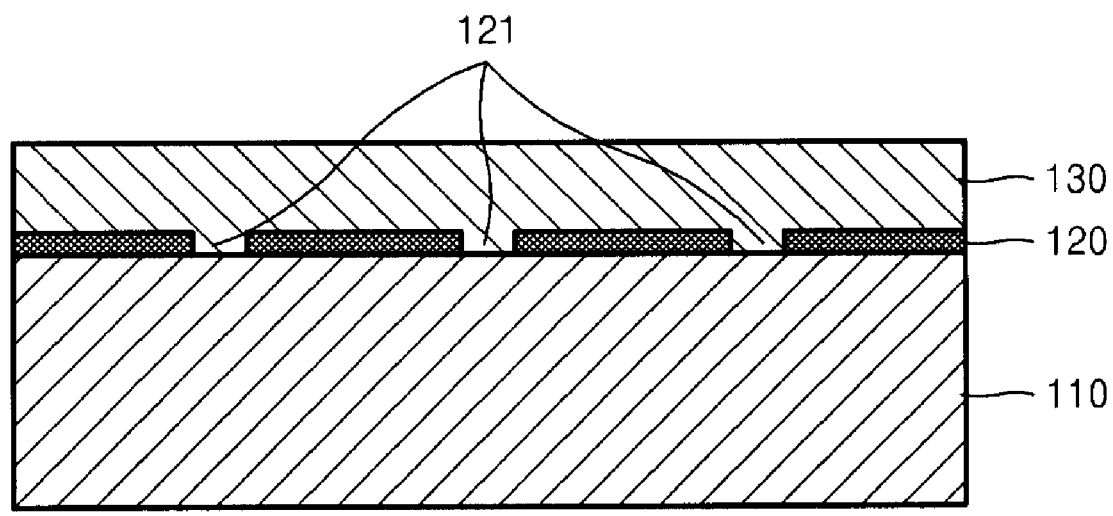

Referring to FIG. 2B, a photoresist 130 is applied on the mask 120 to a predetermined thickness. Then, the photoresist 130 is filled in the openings 121, and is applied on the mask 120. In the current embodiment, a negative photoresist is used, however, the present invention is not limited thereto, and a positive photoresist can be used. A non-exposed portion of the negative photoresist is removed, and an exposed portion of the positive photoresist is removed.

Figure 2C:
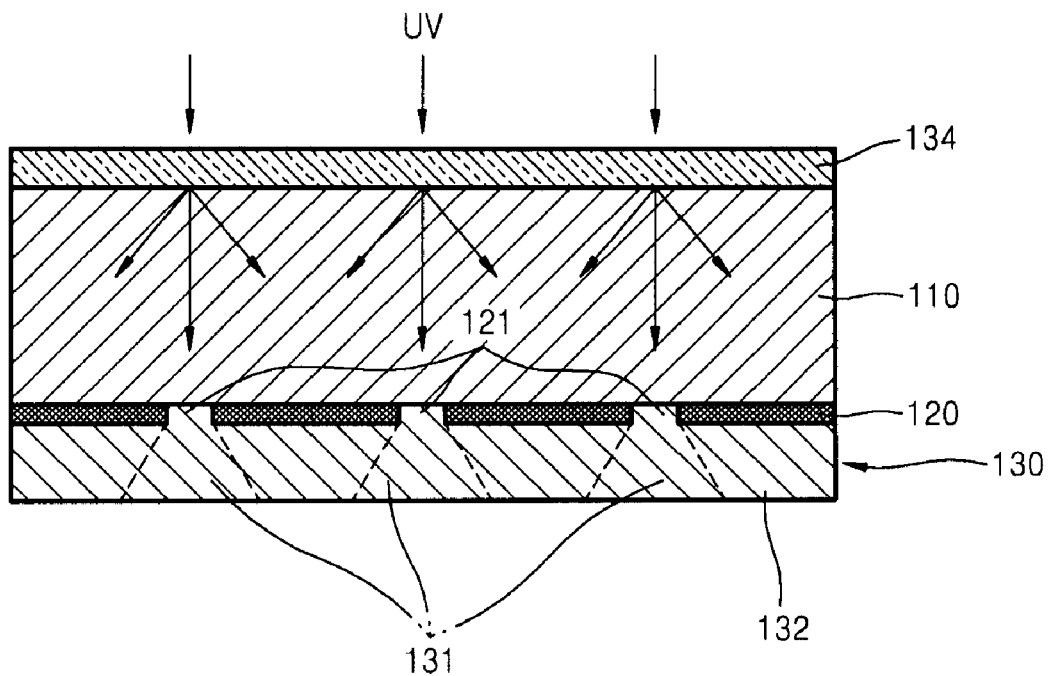

Referring to FIG. 2C, the glass substrate 110 is turned over so that the glass substrate 110 is the upper portion and the photoresist 130 is the lower portion. Next, a diffuser 134 is formed on the glass substrate 110. Then, ultraviolet (UV) rays are irradiated onto the upper portion of the diffuser 134.

The UV rays diffuse through the diffuser 134 and the glass substrate 110 to reach the mask 120. The UV rays continue past a plurality of openings 121, which are formed in the mask 120, and then reach the photoresist 130. Portions of the photoresist 130, exposed by the plurality of openings 121, are exposed to the UV rays while the other portions of the photoresist 130 are non-exposed portions 132. Since the photoresist 130 is a negative photoresist, the exposed portions 131 are cured. Therefore, as the UV rays spread, when passing through the plurality of openings 121, the exposed portions 131 are cured as inverse-prism shapes. Cross-sections of the inverse-prism shape structures are trapezoidal shapes.

Figure 6:
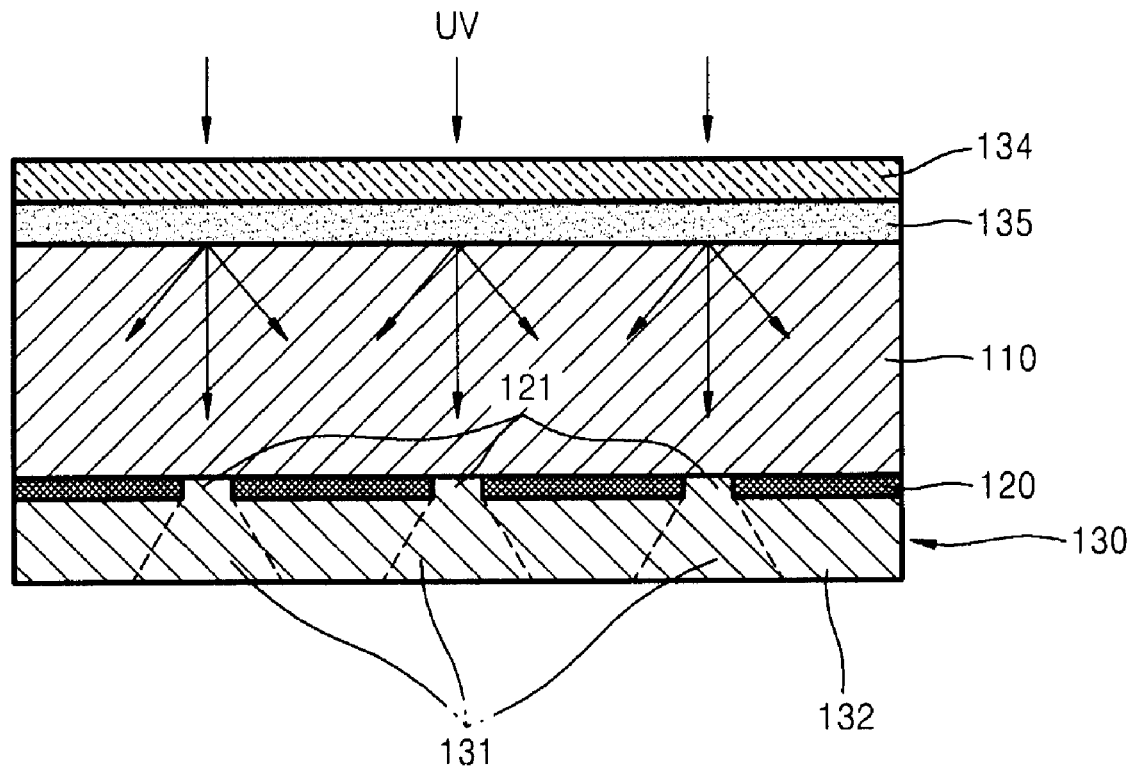
FIG. 6 is a cross-sectional view of another embodiment of the present invention.

Also, as shown in FIG. 6, an index matching material 135 can be further disposed between the diffuser 134 and the glass substrate 110. The index matching material 135 can adjust incident angles into the glass substrate 110 and the photoresist 130 according to a refractive index thereof, and thereby, adjusting a spreading angle of the UV rays. Therefore, the index matching material 135 can adjust the spreading angle of the UV rays with the diffuser 134. On the other hand, although it is not shown in the drawings, only the index matching material 135 can be installed on the glass substrate 110 instead of using the diffuser 134 to adjust the spreading angle of the UV rays.

Figure 2D:
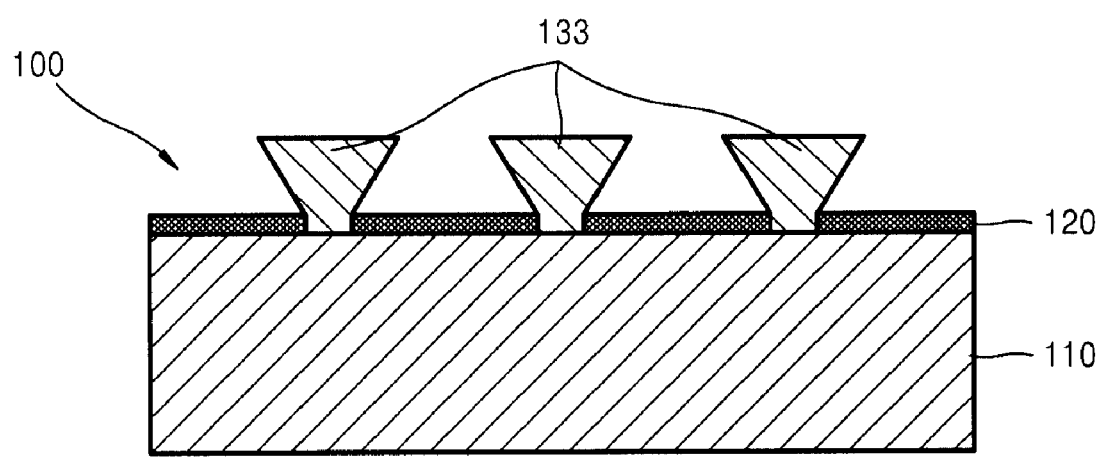

Referring to FIG. 2D, the non-exposed portions 132 (refer to FIG. 2C) are removed by etching, which leaves the exposed portions 131. After the etching process, a master 100, in which a plurality of inverse-prism shape structures 133 are integrally formed on the glass substrate 110, is formed.

Figure 2E:
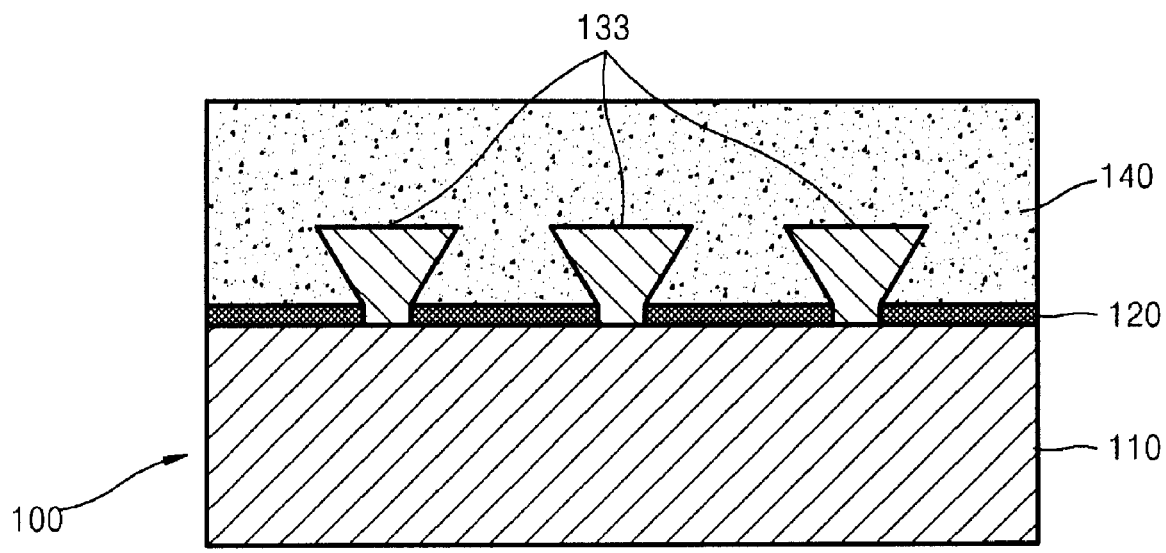

Referring to FIG. 2E, an elastomer 140 is applied on the master 100, in which the plurality of inverse-prism shape structures 133 are integrally formed. The elastomer 140 is a material having an elasticity, for example, a silicon or a rubber.

Figure 2F:
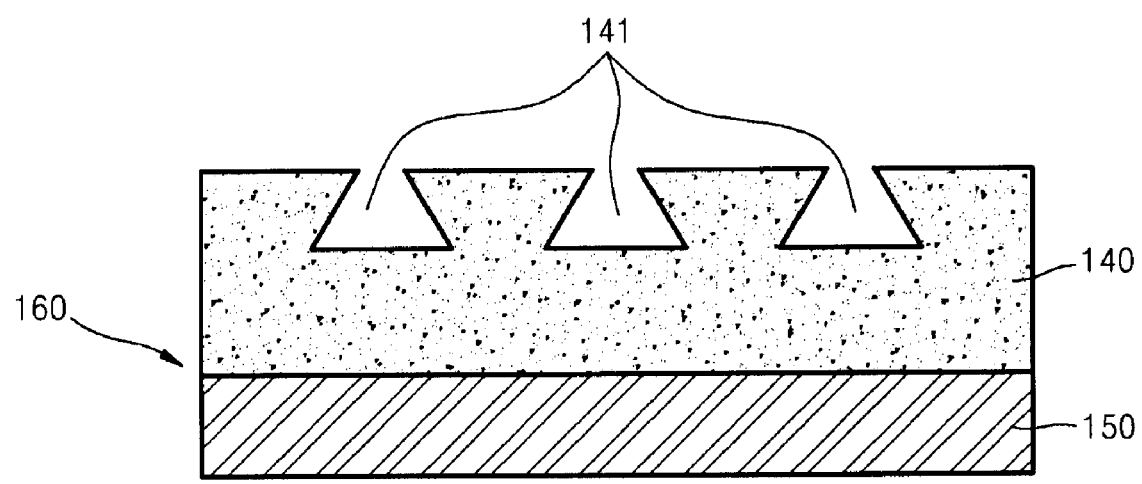

Referring to FIG. 2F, the elastomer 140 is separated from the master 100. The elastomer 140 includes a plurality of molding portions 141, having the same shapes as those of the plurality of inverse-prism shape structures 133. Then, the elastomer 140 is attached to a sub-substrate 150 to form an elastic mold 160.

Figure 1:
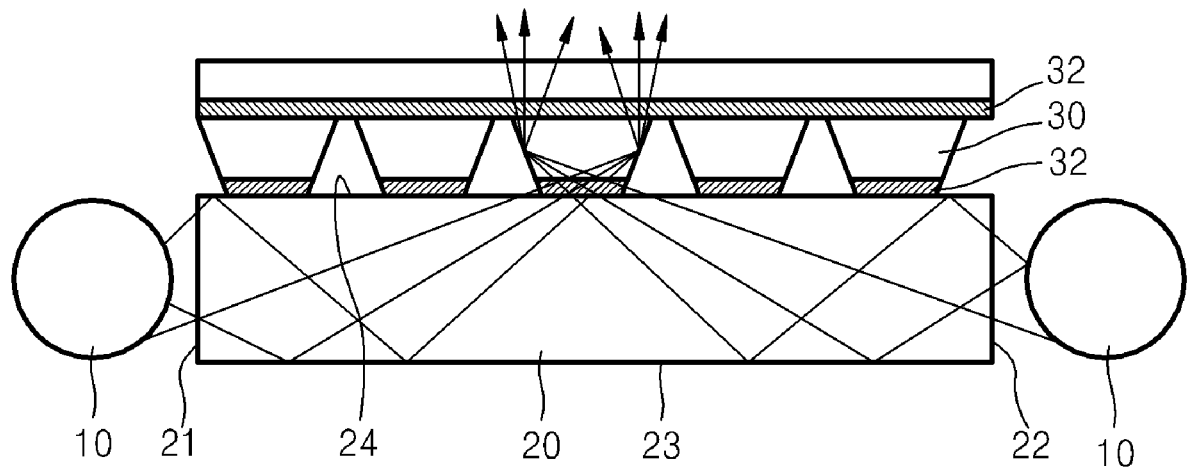
FIG. 1 is a side sectional view of a side emission type backlight apparatus, according to the conventional art.

The elastic mold 160 is a featured element of an embodiment of the present invention. That is, the master is fabricated (refer to FIG. 1), and the all-in-one type light guide plate is fabricated using the master 100, according to conventional art. However, in the current embodiment, a plurality of elastic molds 160 are fabricated using the master, and a plurality of all-in-one type light guide plates can be fabricated using the plurality of elastic molds 160. Since the plurality of elastic molds 160 can be fabricated using one master 100, there is no need to repeat the master fabrication process. Therefore, the all-in-one type light guide plates can be manufactured quickly and easily.

Figure 2G:
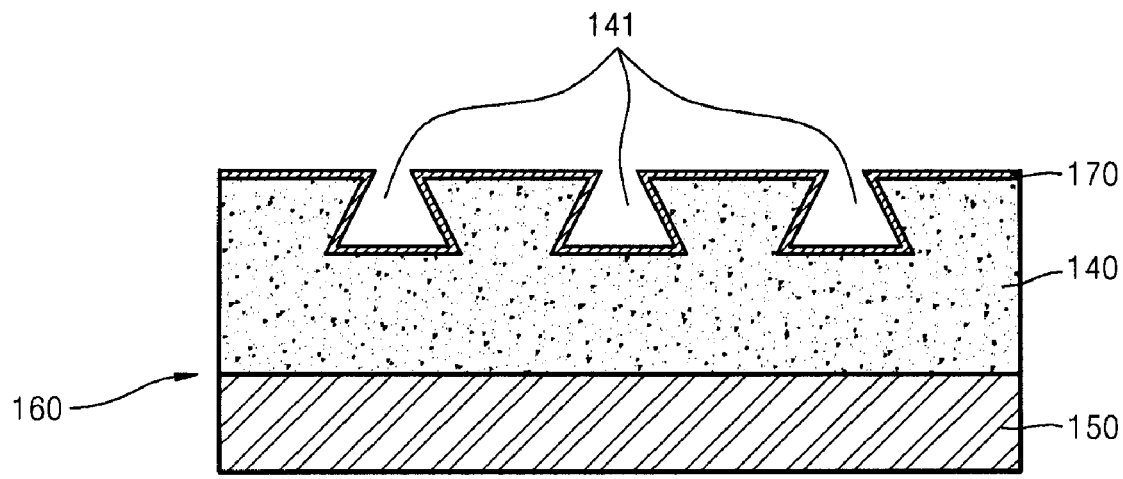

Referring to FIG. 2G, a release layer 170 is formed on an upper portion of the elastomer 140 and in the plurality of molding portions 141 (refer to FIG. 2F). The release layer 170 may be plasma-processed, self-assembled monolayer (SAM) coated, or plasma processed and SAM coated. The plasma process or the SAM coating process is performed when the material, forming the all-in-one type light guide plate, is the same as the elastomer 140. It is almost impossible to separate the elastomer 140 and the all-in-one type light guide plate when they are made of the same material and are coupled.

Therefore, if the material forming the all-in-one type light guide plate is different from the elastomer 140, the plasma process or the SAM coating process can be omitted. The plasma process and the SAM coating process are well known in conventional art, therefore detailed descriptions are omitted.

Figure 2H:
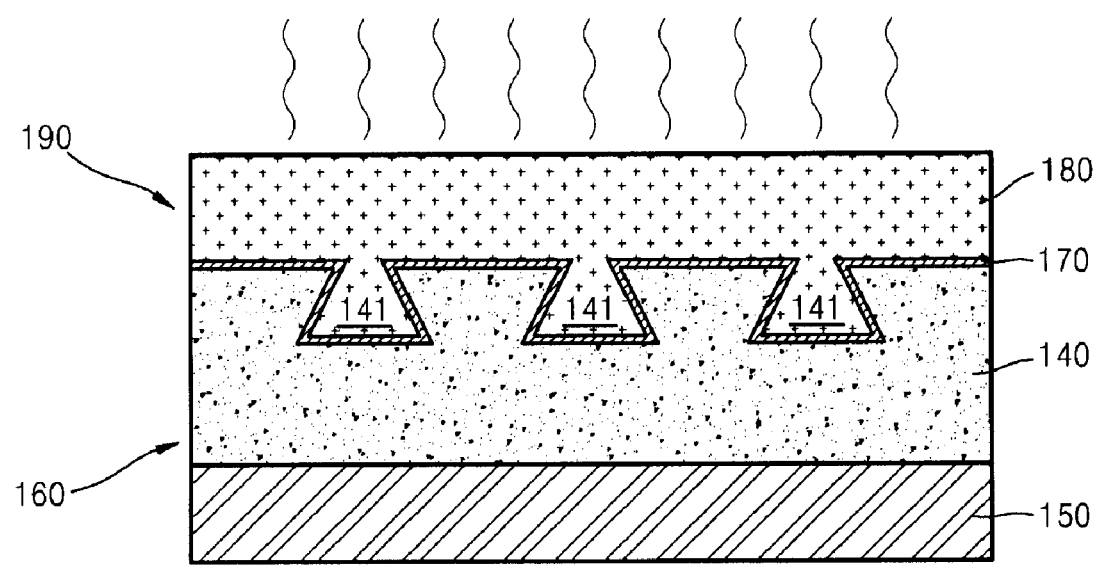

Referring to FIG. 2H, a light transmissive material 180, for forming the all-in-one type light guide plate, is applied on the elastic mold 160 to a predetermined thickness. Then, the light transmissive material 180 is filled into the plurality of molding portions 141. After that, heat or UV rays are applied to cure the light transmissive material 180, and to form an all-in-one type light guide plate 190. Then, the light transmissive material interlocks with the inverse-shape prism shape of the elastic mold. The light transmissive material 180 may be a silicon-based transparent material such as polydimethylsiloxane (PDMS). In addition, polymethyl methacrylate (PMMA), polycarbonate (PC), cyclic olefin polymer (COP), or a UV resin, which is generally used as an optical material of the light guide plate, can be used.

Figure 2I:
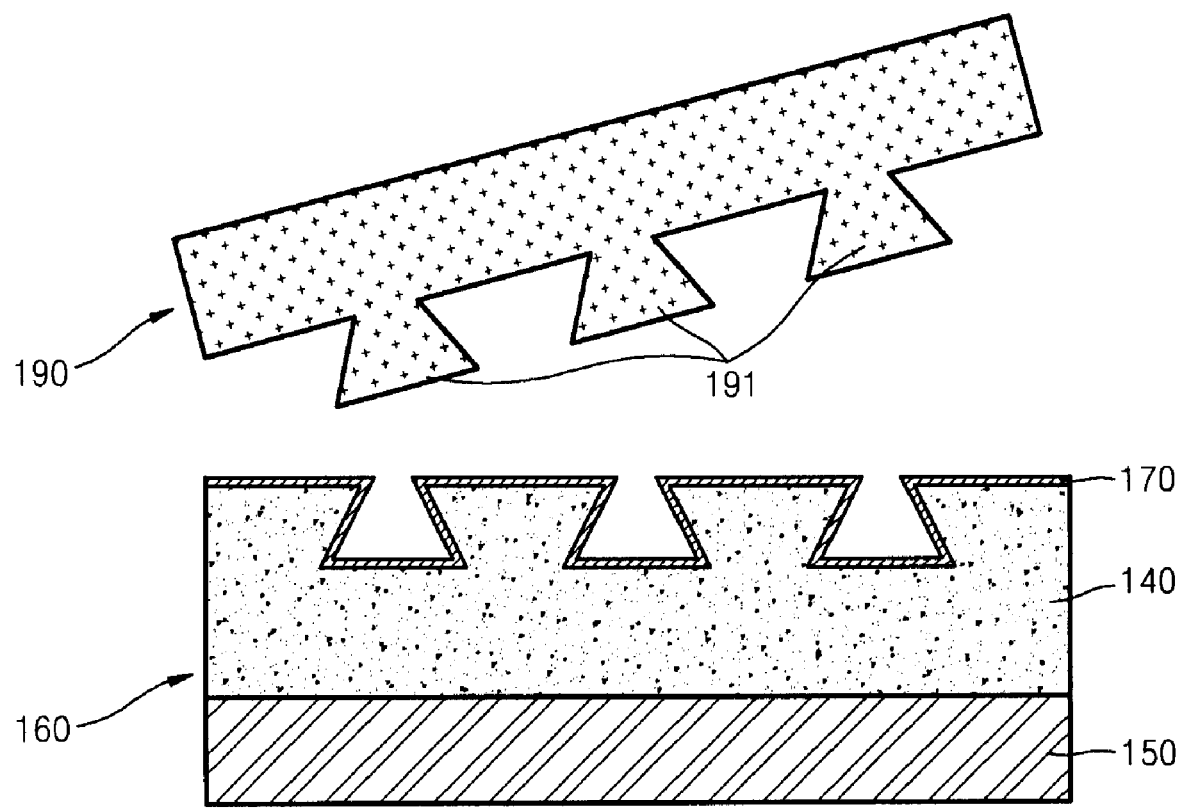

Referring to FIG. 2I, the all-in-one type light guide plate 190 is separated from the elastic mold 160. The all-in-one type light guide plate 190 includes a plurality of inverse-prism shape structures 191.

The material forming the all-in-one type light guide plate 190 can be a material having an elasticity such as the PDMS, or a material having no elasticity such as the PC or PMMA. In addition, a photo-curable material or a thermosetting material can be used as the material forming the all-in-one type light guide plate 190. In particular, a material that is elastic before being separated from the elastic mold 160, and then loses its elasticity by a chemical or an optical process can be used. Even if the material, of the all-in-one type light guide plate 190, has no elasticity, the elastic mold 160 is elastic, and thus, it is not difficult to separate the all-in-one type light guide plate 190 from the elastic mold 160.

On the other hand, the material forming the all-in-one type light guide plate 190 must be optically transparent in order to transmit the light. To explain, the elastic mold 160 does not need to be transparent. However, the material forming the all-in-one type light guide plate must transmit the wavelength of the light source, which is used to cure the material, even if the material forming the all-in-one type light guide plate is a photo-curable material. The material of the elastic mold 160 may have a high tensile strength.

The plurality of inverse-prism shape structures 133, of the master 100, shown in FIG. 2D, and the plurality of inverse-prism shape structures 191, of the all-in-one type light guide plate 190, have identical shapes and sizes. This is possible because the elastic mold 160 is formed using the master 100 and the all-in-one type light guide plate 190 is formed using the elastic mold 160.

Figure 3:
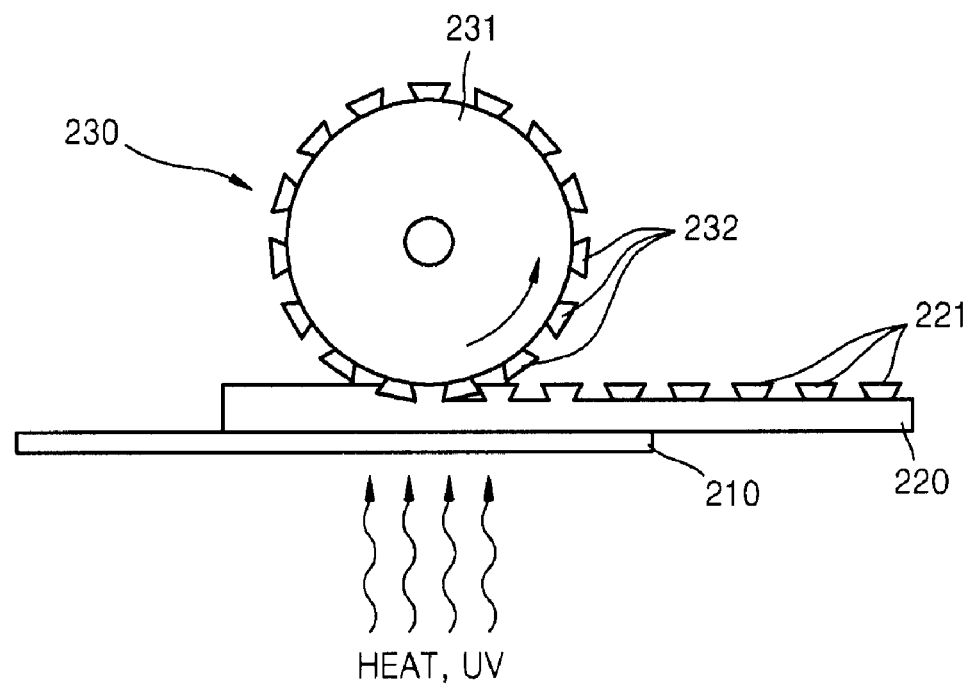
FIG. 3 is a side view illustrating a method of manufacturing an all-in-one type light guide plate, according to another embodiment of the present invention.

FIG. 3 is a side view illustrating a method of manufacturing an all-in-one type light guide plate, according to another embodiment of the present invention.

Referring to FIG. 3, a light transmissive material 220 is placed on a base 210. Then, an elastic roller mold 230 is rotated, in a direction denoted by the arrow, on the light transmissive material 220 to form a plurality of inverse-prism shape structures 221.

The elastic roller mold 230 includes a roller 231, formed of an elastomer, and a plurality of inverse-prism shape blocks 232, which protrudes from an outer circumferential surface of the roller 231. When the elastic roller mold 230 is rolled on the light transmissive material 220, the plurality of the inverse-prism shape blocks 232 pushes the light transmissive material 220 to form the plurality of inverse-prism shape structures 221. When the elastic roller mold 230 contacts the light transmissive material 220, heat or UV rays are irradiated to plastically deform the light transmissive material 220. When the light transmissive material 220 is plastic-deformed, it is not difficult to separate the light transmissive material 220 from the elastic roller mold 230, since the elastic roller mold 230 is elastic.

Figure 4:
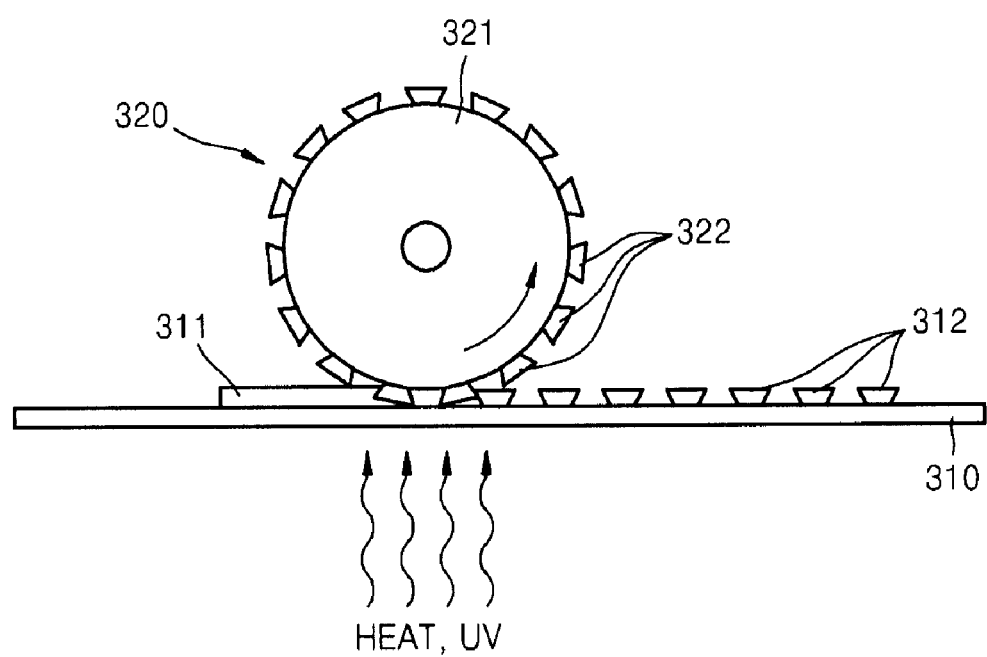
FIG. 4 is a side view illustrating a method of manufacturing an all-in-one type light guide plate, according to another embodiment of the present invention.

FIG. 4 is a side view illustrating a method of manufacturing an all-in-one type light guide plate, according to another embodiment of the present invention.

Referring to FIG. 4, a light transmissive material 311 is placed on a light transmissive material 310. Then, an elastic roller mold 320, including a roller 321 and a plurality of inverse-prism shape blocks 322, is rotated, in a direction denoted by the arrow, on the light transmissive material 311 to form a plurality of inverse-prism shape structures 312. Then, heat or UV rays are irradiated onto the light transmissive material 311 to plastically deform the light transmissive material 311, as shown in the embodiment above. Then, the light transmissive material interlocks with the inverse-shape prism shape of the elastic roller mold.

Moreover, instead of placing the light transmissive materials on top of each other, a light transmissive material, having a predetermined thickness, can be placed, and the plurality of inverse-prism shape structures can be formed using the elastic roller mold.

Figure 5:
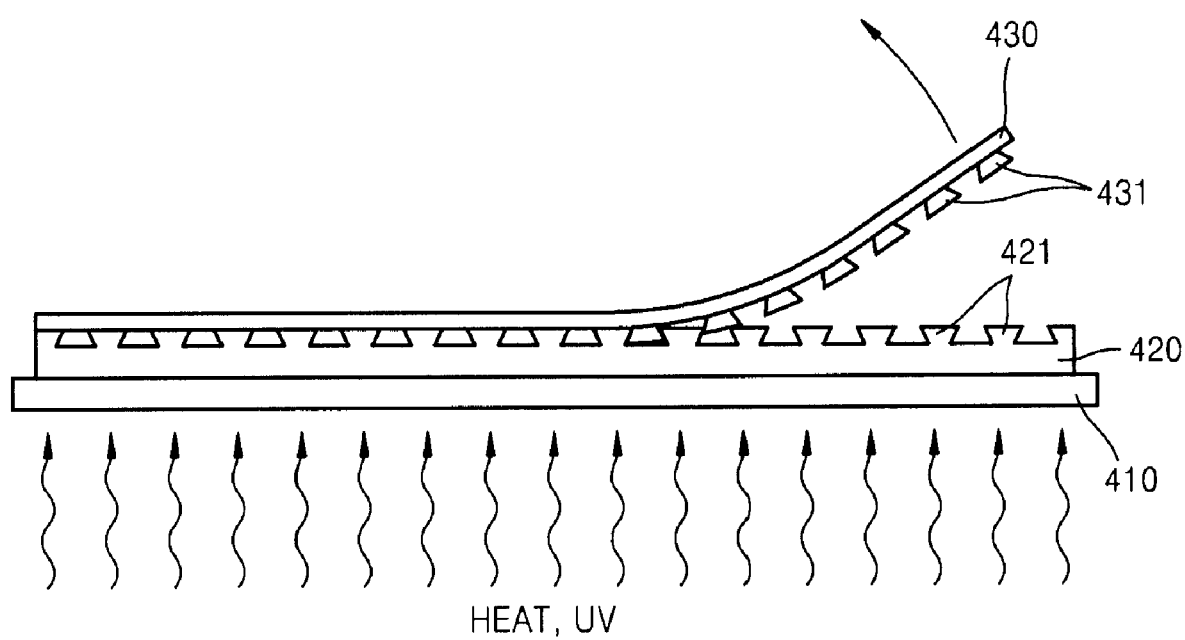
FIG. 5 is a side view illustrating a method of manufacturing an all-in-one type light guide plate, according to another embodiment of the present invention.

FIG. 5 is a side view illustrating a method of manufacturing an all-in-one type light guide plate, according to another embodiment of the present invention.

Referring to FIG. 5, a light transmissive material 420 is placed on a base 410. Then, an elastic sheet mold 430 is placed on the light transmissive material 420. The elastic sheet mold 430 is compressed towards the light transmissive material 420 to form a plurality of inverse-prism shape structures 421 on the light transmissive material 420. Then, the elastic sheet mold 430 is separated from the light transmissive material 420.

The elastic sheet mold 430 is formed of an elastomer, and includes a plurality of inverse-prism shape blocks 431, protruding from a side thereof. When the light transmissive material 420 is pressed by the elastic sheet mold 430, heat or UV rays are irradiated onto the light transmissive material 420 to plastically deform the light transmissive material 420. Then, the light transmissive material interlocks with the inverse-shape prism shape of the elastic sheet mold. As the light transmissive material 420 is plastic-deformed, the light transmissive material 420 can be easily separated from the elastic sheet mold 430.

As described above, according to the method of manufacturing the all-in-one type light guide plate of the present invention, a plurality of elastic molds can be fabricated using one master, and thus, a plurality of all-in-one type light guide plates can be manufactured. Since an elastic mold is used, various light emitting structures can be formed. In addition, the light guide plate can be separated from the elastic mold, which is elastic. A variety of materials forming the light guide plate can be selected. Also, the light guide plate can be produced, in large quantities, using the elastic roller mold and the elastic sheet mold.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of manufacturing an all-in-one type light guide plate, the method comprising:

fabricating a master including a plurality of inverse-prism shape structures;

forming an elastic mold by applying an elastomer on the master;

fabricating the all-in-one type light guide plate, on which a plurality of inverse-prism shape structures are integrally formed, by applying a light transmissive material on the elastic mold and curing the light transmissive material, and plastic deforming a portion where the elastic mold and the light transmissive material contact each other, and separating the all-in-one type light guide plate from the elastic mold, wherein the inverse-prism shape structures have trapezoidal shapes such that when applied to the elastic mold and then cured, the light transmissive material interlocks therewith.

2. The method of claim 1, wherein the fabricating of the master comprises:
forming a mask, on which a plurality of openings for forming a plurality of inverse-prism shape structures are patterned, on a glass substrate;
depositing a photoresist on the mask;
irradiating ultraviolet rays (UV) from an upper portion of the glass substrate, to spread the UV rays; and
forming the plurality of inverse-prism shape structures by removing portions of the photoresist, which are not exposed to the UV rays.

3. The method of claim 2, wherein the forming of the elastic mold comprises:
applying the elastomer on the master; and
separating the elastomer, including a plurality of molding portions for forming the plurality of inverse-prism shape structures, from the master.

4. The method of claim 3, wherein after the separation of the elastomer from the master, the elastomer, including the molding portions for forming the plurality of inverse-prism shape structures, is attached on a sub-substrate.

5. The method of claim 1, wherein if the light transmissive material applied on the elastic mold is the same as the material of the elastic mold, the elastic mold is plasma-processed before applying the light transmissive material.

6. The method of claim 1, wherein if the light transmissive material applied on the elastic mold is the same as the material of the elastic mold, the elastic mold is self-assembled monolayer (SAM) coated before applying the light transmissive material.

7. The method of claim 1, wherein if the light transmissive material applied on the elastic mold is the same as the material of the elastic mold, the elastic mold is plasma-processed and self-assembled monolayer (SAM) coated before applying the light transmissive material.

8. The method of claim 1, wherein the light transmissive material is a silicon-based transparent material.

9. The method of claim 8, wherein the light transmissive material is one selected from the group consisting of polydimethylsiloxane (PDMS), polymethyl methacrylate (PMMA), polycarbonate (PC), cyclic olefin polymer (COP), and a UV resin.

10. A method of manufacturing an all-in-one type light guide plate, the method comprising:
disposing a light transmissive material, for forming the all-in-one type light guide plate, on a base;
forming a plurality of inverse-prism shape structures on the light transmissive material by rotating an elastic roller mold, which includes a roller formed of an elastomer and a plurality of inverse-prism shape blocks protruding from an outer circumferential surface of the roller, on the light transmissive material;
fabricating the all-in-one type light guide plate, on which a plurality of inverse-prism shape structures are integrally formed, by curing the light transmissive material;
plastic deforming a portion where the elastic roller mold and the light transmissive material contact each other; and
separating the all-in-one type light guide plate from the elastic roller mold,
wherein the inverse-shape prism shape structures have trapezoidal shapes such that when the elastic roller mold contacts the light transmissive material and then are cured, the light transmissive material interlocks therewith.

11. The method of claim 10, wherein the light transmissive material is plastic cured by applying heat.

12. The method of claim 10, wherein the light transmissive material is plastic deformed by applying UV rays.

13. The method of claim 10, wherein a substrate, formed of the light transmissive material, is used as the base, the light transmissive material is applied onto the substrate, and the plurality of inverse-prism shape structures are formed on the substrate using the elastic roller mold.

14. The method of claim 10, wherein the light transmissive material is a silicon-based transparent material.

15. The method of claim 14, wherein the light transmissive material is one selected from the group consisting of PDMS (polydimethylsiloxane), polymethyl methacrylate (PMMA), polycarbonate (PC), cyclic olefin polymer (COP), and a UV resin.

16. A method of manufacturing an all-in-one type light guide plate, the method comprising:
disposing a light transmissive material, for forming the all-in-one type light guide plate, on a base;
forming a plurality of inverse-prism shape structures on the light transmissive material by placing an elastic sheet mold, which is formed of an elastomer and includes a plurality of inverse-prism shape blocks protruding from a side of the elastic sheet mold, on the light transmissive material and pressing the elastic sheet mold;
fabricating the all-in-one type light guide plate, on which a plurality of inverse-prism shape structures are integrally formed, by curing the light transmissive material;
plastic deforming a portion where the elastic sheet mold and the light transmissive material contact each other; and
separating the all-in-one type light guide plate from the elastic sheet mold,
wherein the inverse-prism shape structures have trapezoidal shapes such that when the elastic sheet mold is pressed to the light transmissive material and then cured, the light transmissive material interlocks therewith.

17. The method of claim 16, wherein the light transmissive material is cured by applying heat or UV rays.

18. The method of claim 2, further comprising:
employing a diffuser through which the ultraviolet rays are irradiated, and
disposing an index matching material between the diffuser and the glass substrate.

* * * * *